United States Patent [19]
Atake

[11] Patent Number: 5,851,558
[45] Date of Patent: Dec. 22, 1998

[54] FOIL-DECORATING INJECTION MOLDING MACHINE

[75] Inventor: Hiroyuki Atake, Tokyo-To, Japan

[73] Assignee: Dai Nippon Printing Co., Ltd., Tokyo, Japan

[21] Appl. No.: 755,571

[22] Filed: Nov. 27, 1996

[51] Int. Cl.⁶ .......................... B29C 45/14; B29C 45/27
[52] U.S. Cl. ................. 425/111; 425/129.1; 425/568; 425/573; 425/577; 264/328.12
[58] Field of Search ........................... 249/107; 425/557, 425/568, 573, 577, 388, DIG. 51, 111, 129.1; 264/328.12, 328.13, 328.9, 328.8

[56] References Cited

U.S. PATENT DOCUMENTS

| | | | |
|---|---|---|---|
| 3,829,548 | 8/1974 | Edwards | 264/328.12 |
| 4,012,025 | 3/1977 | Ernst et al. | |
| 4,403,933 | 9/1983 | Davis et al. | 264/328.12 |
| 5,262,105 | 11/1993 | Komiyama et al. | 264/328.12 |
| 5,380,187 | 1/1995 | Fujikawa | 425/573 |
| 5,543,104 | 8/1996 | Stratford et al. | 425/573 |

FOREIGN PATENT DOCUMENTS

| | | | |
|---|---|---|---|
| 47-46458 | 11/1972 | Japan | 264/328.12 |

OTHER PUBLICATIONS

Patent Abstract of Japan, vol. 016, No. 405 (M–1301), 26 Aug. 1992 & JP 04 135818 A (Toppan Printing Co. Ltd.), 11 May 1992.

Patent Abstract of Japan, vol. 015, No. 325 (M–1148), 19 Aug. 1991 & JP 03 124416 A (Nissha Printing Co. Ltd.), 28 May 1991.

*Primary Examiner*—Khanh P. Nguyen
*Attorney, Agent, or Firm*—Morgan & Finnegan LLP

[57] ABSTRACT

A foil decorating injection molding machine is provided with an injection mold having a male mold and a female mold. The male mold is provided with a hot runner, a reversing passage connected to the hot runner, and gates connected to the reversing passage and opening into a cavity formed by the male mold and the female mold. The reversing passage has a straight forward feed section connected to the hot runner, a distributing section formed at the downstream end of the forward feed section facing a solid land disposed in the cavity, and reverse feed sections extending from the distributing section to the upstream ends of the gates, respectively, in an obliquely reverse direction at an acute angle to the forward feed section.

6 Claims, 7 Drawing Sheets

FOIL-DECORATING INJECTION MOLDING MACHINE

BACKGROUND OF THE INVENTION

1. Field of the Invention

The present invention relates to a foil-decorating injection molding machine capable of producing a molding decorated by patterns and characters by simultaneously forming the molding by injection molding and attaching a decorative sheet to the molding.

2. Description of the Related Art

Generally known foil-decorating injection molding methods, which injection-mold a molding in a cavity of an injection mold having a male mold and a female mold, and attach a web-fed or sheet-fed decorative sheet to the molding, are classified into a method comprising feeding the decorative sheet into a space between the male and the female mold, preheating the decorative sheet by a hot plate or the like for softening, attaching the softened decorative sheet closely to the cavity surface of the female mold by vacuum forming and/or pressure forming (preforming process), joining together the male and the female mold, and injecting a molten resin into the cavity through the male mold to injection-mold a molding, such as disclosed in U.S. Pat. No. 4,639,341 to Hanamoto et al., and another method not including any preforming process, and comprising holding a flat decorative sheet between the male mold and the female mold of an injection mold, injecting a molten metal into the cavity formed in the injection mold to mold a molding and, at the same time, to deform the decorative sheet by the heat and pressure of the molten metal injected into the mold cavity so that the decorative sheet is deformed so as to extend along the cavity surface of the female mold and attached to the surface of the molding, such as disclosed in JP-B No. 2-42080.

A laminated decorative sheet or a transfer decorative sheet is used depending on the type of a product to be produced. If a laminated decorative sheet is used, the laminated decorative sheet is attached integrally to the surface of an injection-molded molding to form a decorative layer. If a transfer decorative sheet, which has a substrate and a decorative transfer layer formed on the substrate, is used, the transfer decorative sheet is attached to the surface of a molding, and then the substrate is removed from the molding so that only the decorative transfer layer remains on the surface of the molding.

A foil-decorating injection molding machine provided with an injection mold having a male and a female mold forming a cavity is used for simultaneous injection molding and foil decoration. The male mold of the injection mold is provided with a cold runner 62 as shown in FIGS. 5 and 6 or a hot runner 46 as shown in FIG. 7 to connect a sprue to the mold cavity.

Figure 6:
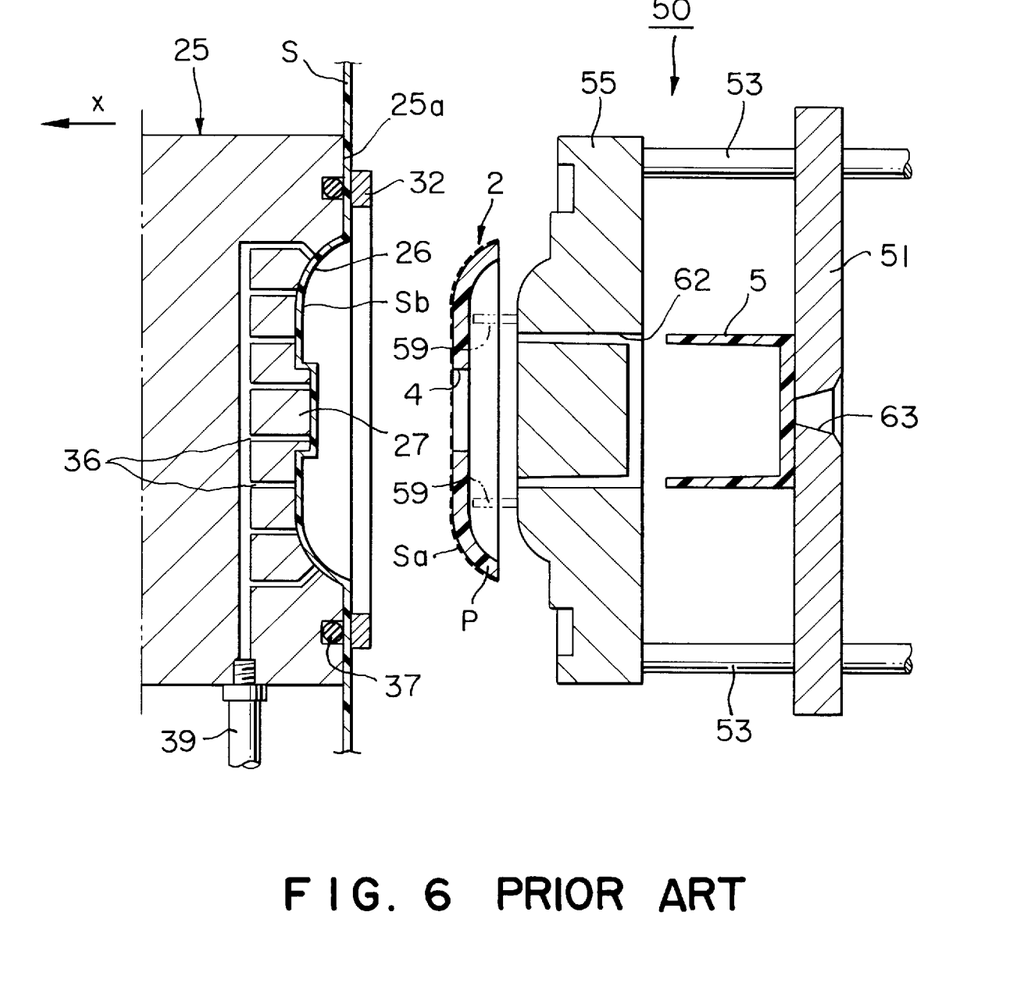
FIG. 6 is a sectional view of the injection mold of FIG. 5 in a mold ejecting process.
Figure 7:
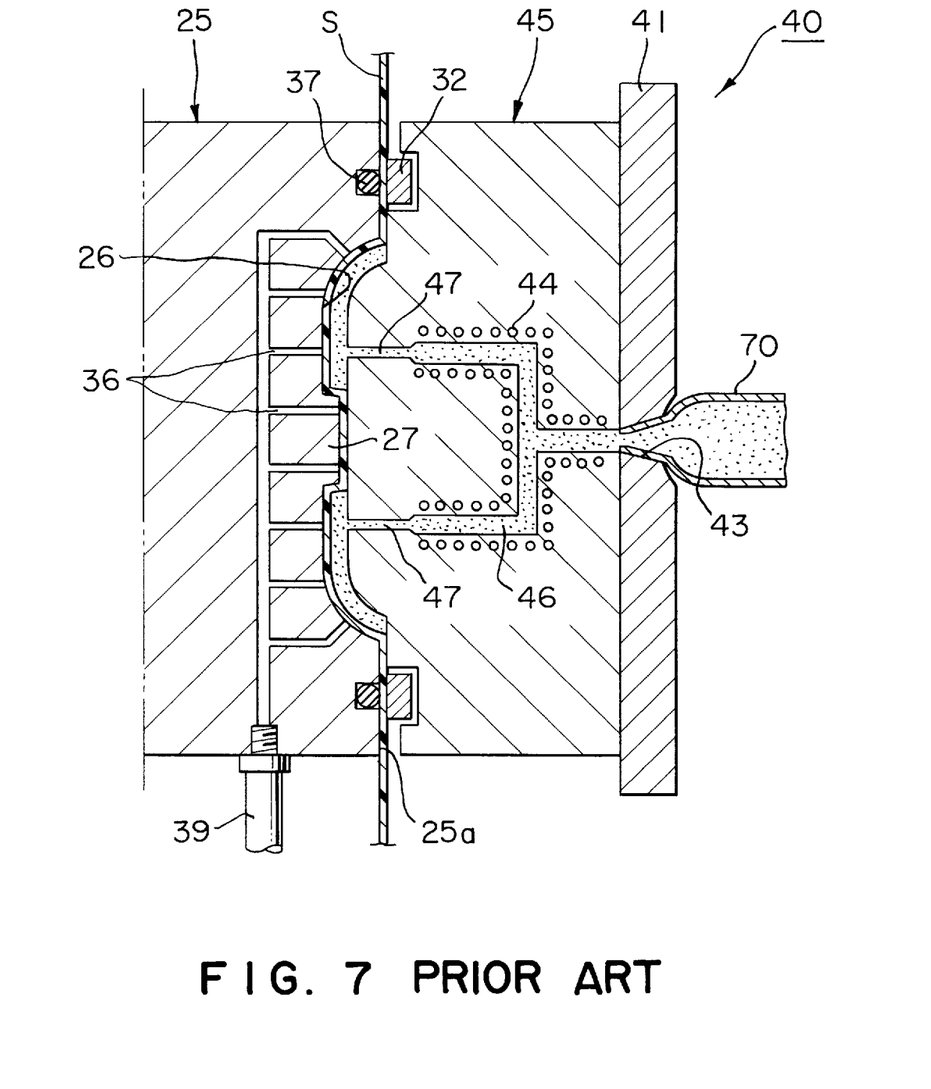
FIG. 7 is a sectional view of an injection mold of assistance in explaining an injection molding process to be carried out by another prior art foil-decorating injection molding machine.
Figure 8:
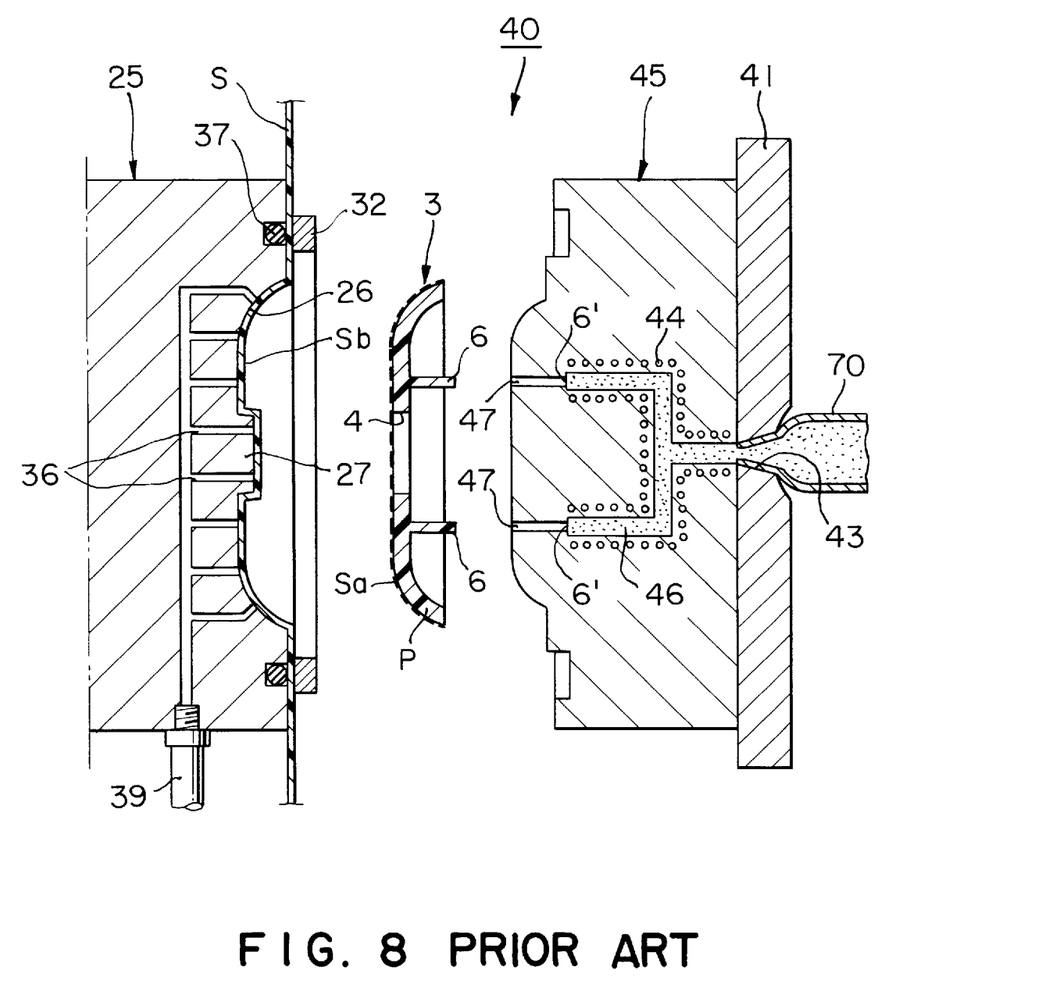
FIG. 8 is a sectional view of the injection mold of FIG. 6 in a mold ejecting process.

A description will be made of a foil-decorating injection molding method including a preforming process, using a transfer decorative sheet, and applied to injection-molding a molding having a central opening as shown in FIGS. 6 and 8.

Figure 4:
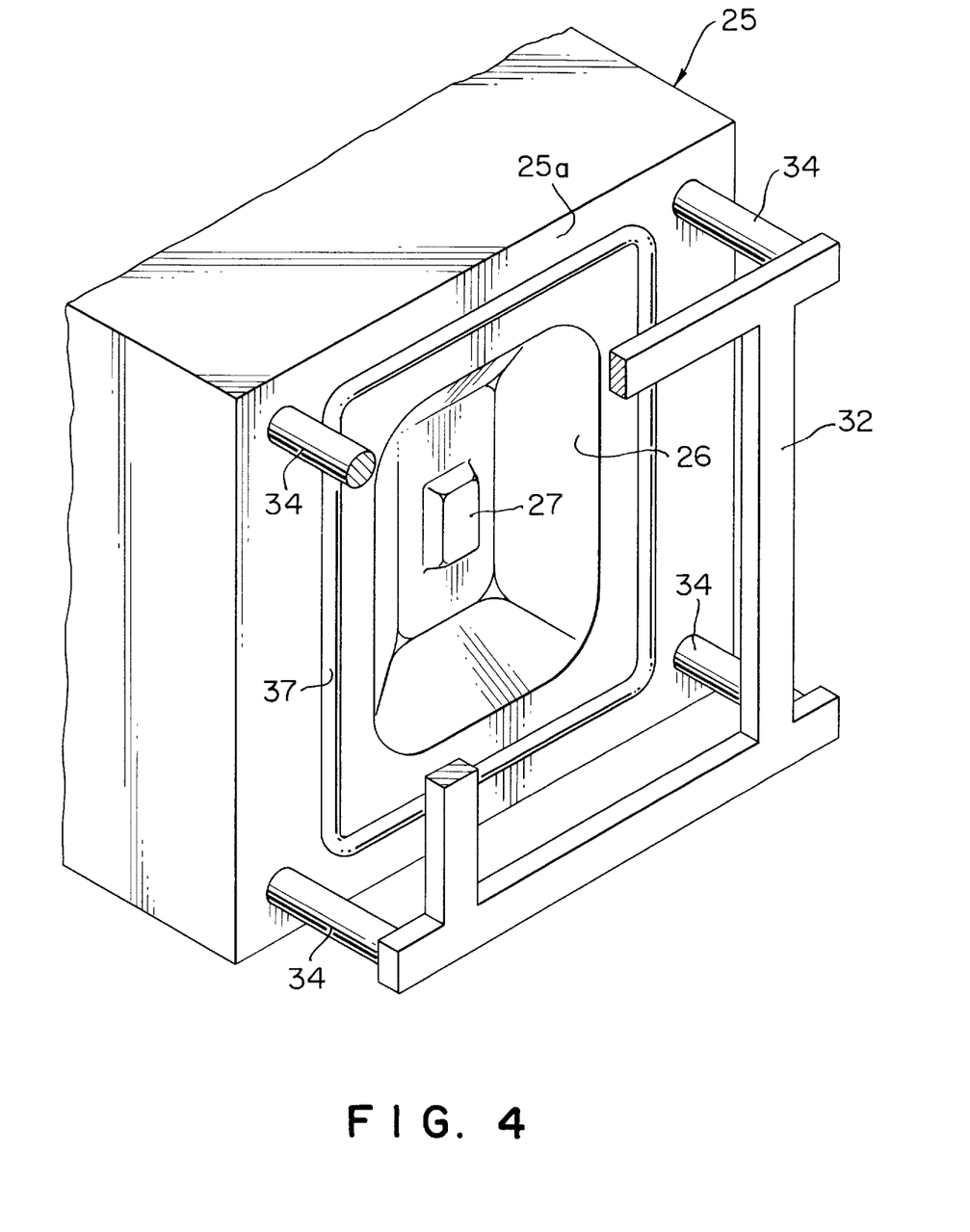
FIG. 4 is a fragmentary perspective view of a female mold of the injection mold of FIG. 1, and associated components.
Figure 5:
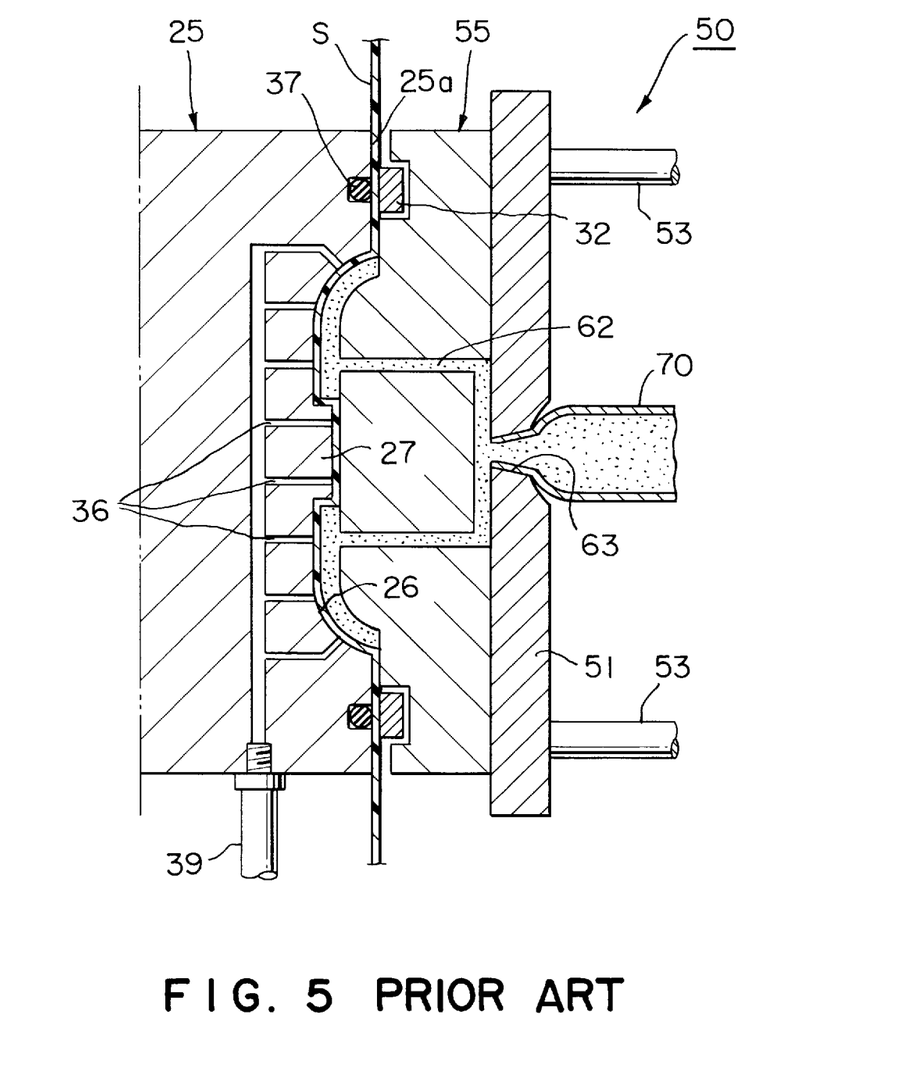
FIG. 5 is a sectional view of an injection mold of assistance in explaining an injection molding process to be carried out by a prior art foil-decorating injection molding machine.

Referring to FIGS. 5 and 6 showing an injection mold 50 employed in a foil-decorating injection molding machine, a male mold 55 is guided for movement relative to a stationary platen 51, and the stationary platen 51 is provided with a nozzle seat 63 on which a nozzle 70 included in an injection unit is seated. The male mold 55 is provided in its central portion with a U-shaped runner 62 having two legs extended perpendicularly to a molding surface of the male mold 55. The runner 62 is kept at a temperature far lower than the melting point of a resin to be used for injection molding. As best shown in FIG. 4, a female mold 25 has a recess for forming a cavity 26, and a sheet holding member 32 having the shape of a rectangular frame is supported at its four corners by a sliding rods 34 for movement relative to the female mold 25. A transfer decorative sheet S is held fixedly on a parting surface 25a of the female mold 25 by the sheet holding member 32. The transfer decorative sheet S has a substrate Sb and a transfer decorative layer Sa formed on the substrate Sb. The sheet holding member 32 is driven for movement by a driving mechanism, such as a hydraulic cylinder actuator, installed on the bottom of the female mold 25. An elastic O-ring 37 is fitted in an endless groove formed in the parting surface 25a of the female mold 25 so as to correspond to the sheet holding member 32 for hermetic sealing. The female mold 25 is provided with suction holes 36 opening into the recess to attract a decorative sheet S closely to the cavity surface of the female mold 25 by suction. The suction holes 36 are connected to a suction pipe 39.

In the operation of the foil-decorating injection molding machine provided with the injection mold 50 thus constructed, a decorative sheet S for the next injection molding cycle is placed on the parting surface 25a of the female mold 25 behind the sheet holding member 32, the decorative sheet S is held fixedly on the parting surface 25a of the female mold 25 by the sheet holding member 32, the decorative sheet S is heated by a hot plate or the like for hot softening, a suction is applied through the suction holes 36 to the decorative sheet S in order that the decorative sheet S is extended along and in close contact with the cavity surface of the female mold 25 for preforming, the female mold 25 is advanced toward the male mold 55 to close the injection mold, a molten resin is injected through the runner 62 of the male mold 55 into the cavity 26 for injection molding, the female mold 25 is moved away from the male mold 55 to open the injection mold, and then a decorated molding 2 decorated by the transfer decorative layer Sa of the decorative sheet S is removed from the male mold 25 and the female mold 55.

When removing the decorated molding 2 from the injection mold, first the female mold 25 is retracted along the x-axis as shown in FIG. 6. Consequently the decorated molding 2 decorated by the transfer decorative layer Sa, having a rectangular opening 4 in its central part and held on the male mold 55 is exposed. The male mold 55 is moved along the X-axis from the stationary platen 51 toward the female mold 25 simultaneously with the retraction of the female mold 25 or after the female mold 25 has been retracted. The distance traveled along the X-axis by the female mold 25 is longer than that traveled along the X-axis by the male mold 55. Thus, a U-shaped molding 5 remaining in the U-shaped runner 62 is extracted from the runner 62. The decorated molding 2 adhering to the male mold 55 is separated from the male mold 55 with ejector pins 59 or compressed air. The substrate Sb of the decorative sheet S remaining on the cavity surface of the female mold 25 is cut out inside or outside the female mold 25, and then a decorative sheet S for the next injection molding cycle is fed onto the female mold 25.

Another foil-decorating injection molding machine is provided with an injection mold 40 shown in FIGS. 7 and 8, which comprises a female mold 25 of the same construction as the female mold 25 of the injection mold 50 of the foil-decorating injection molding machine shown in FIGS. 5 and 6, and a male mold 45 different from the male mold 55 of the injection mold 50 of the foil-decorating injection molding machine shown in FIGS. 5 and 6. The male mold 45 is attached to a stationary platen 41. The male mold 45 is provided with a U-shaped hot runner 46 having two legs, and a heating element 44, such as a heating wire, surrounding the hot runner 46. The stationary platen 41 is provided with a nozzle seat 43 on which a nozzle 70 included in an injection unit is seated to inject a molten resin through the hot runner 46 into a cavity 26 formed between the male mold 45 and the female mold 25. The legs of the hot runner 46 are connected to straight gates 47 through which the molten resin is injected into the cavity 26. The hot runner 46 is kept at a temperature not lower than the melting point of the resin to be injected into the cavity 26.

The foil-decorating injection molding machine provided with the injection mold 40 having the male mold 45 carries out a foil-decorating injection molding process similar to that to be carried out by the foil-decorating injection molding machine provided with the injection mold 40. After the injection mold having the female mold 25 and the male mold 45 has been opened, a decorated molding 3, which is the same in shape as the decorated molding 2 of FIG. 6, having an outer surface decorated by a transfer decorative layer Sa and provided with an opening 4 is removed from the foil-decorating injection molding machine by a servomotor-driven automatic ejecting mechanism of an air ejection type. Pin-shaped moldings 6 formed in the gates 47 are removed from the male mold 45 together with the molding 3, and are removed by a suitable means to complete the decorated molding 3. The resin staying in the hot runner 46 remains in a liquid phase and is used for the next injection molding cycle. Therefore, the male molding 45 need not be moved away from the stationary platen 41.

In the foil-decorating injection molding machine provided with the injection mold 50 of a cold runner system shown in FIGS. 5 and 6, the male mold 55 as well as the female mold 25 needs to be moved a long distance from the stationary platen 51 toward the female mold 25 to extract the U-shaped molding 5 from the U-shaped runner 62. When the male mold 55 is moved toward the female mold 25 to extract the U-shaped molding 5, the space between the male mold 55 and the female mold 25 is too narrow to insert the automatic ejecting mechanism therein. The space between the female mold 25 and the male mold 55 needs to be increased by moving the female mold 25 an increased distance away from the male mold 55. Consequently the foil-decorating injection molding machine provided with the injection mold 50 inevitably has a size very large as compared with the size of the molding and takes a large space for installation, and the foil-decorating injection molding machine provided with the injection mold 50 needs a long injection molding cycle and is unsatisfactory in productivity. Furthermore, the foil-decorating injection molding machine provided with the injection mold 50 needs a complicated mechanism associated with the injection mold.

In the foil-decorating injection molding machine provided with the injection mold 40 of a hot runner system shown in FIGS. 7 and 8, cooled and set resin chips 6' remain at the junctions of the extremities of the legs of the hot runner 46 and the gates 47. When these resin chips 6' are injected into the cavity 26 in the subsequent injection molding cycle, it is possible that the resin chips 6' adhere to the decorative sheet S and cause faulty molding and faulty decoration due to the unsatisfactory adhesion of the transfer decorative layer Sa of the decorative sheet S to the molding 3, and the omission of portions of the decorative pattern.

SUMMARY OF THE INVENTION

Accordingly, it is an object of the present invention to provide a foil-decorating injection molding machine employing an injection mold including a female mold and a male mold provided with a hot runner and capable of being opened by moving the female mold by a short mold opening stroke, taking a small space for installation, capable of operating at an improved productivity, of preventing faulty foil-decorating injection molding even if a residual set resin chip exists in the extremity of the hot runner at the start of an injection molding cycle, of producing moldings at an improved yield and of operating with improved reliability.

With the foregoing object in view, the present invention provides a foil-decorating injection molding machine comprising an injection unit, and an injection mold including a female mold provided with a recess for forming a cavity, and a male mold provided with a hot runner and a gate through which a molten resin is injected into a cavity formed between the male and the female mold, wherein a land is formed so as to protrude into the cavity with its top surface in contact with an opposite mold when the injection mold is closed, and a reversing passage is formed between the hot runner and the gate so that a molten resin flows first toward the land, and then flows in a reverse direction toward an upstream end of the gate.

More specifically, the reversing passage is connected to the downstream end of the hot runner of the male mold designed for use for foil-decorating injection molding. First, the molten resin flows through the hot runner and a forward feed section of the reversing passage to a portion of the reversing passage facing the land protruding into the cavity, flows in the reverse direction along the reverse feed section of the reversing passage toward the upstream end of the gate, and then flows into the cavity for forming the molding.

If a residual set resin chip exists at the downstream end of the hot runner after the completion of the preceding injection molding cycle, the residual set resin chip is forced to move along a forward feed section of the reversing passage toward the surface of the land at the start of the next injection molding cycle, and does not move into the cavity for forming the molding.

Since the male mold is provided with the hot runner, the male mold need not be moved whereas the male mold provided with a cold runner needs to be moved to remove a set resin molding staying in the cold runner. Consequently, the injection mold can be opened by a short mold opening stroke, and the foil-decorating injection molding machine takes a relatively small space for installation, operates at an improved productivity, needs a simple mechanism associated with the injection mold, prevents faulty foil-decorating injection molding even if a residual set resin chip exists in the extremity of the hot runner at the start of an injection molding cycle, produces moldings at an improved yield and operates with improved reliability.

According to the present invention, the male and the female mold of the injection mold are made of a metal, such as iron, or a ceramic material, and may be sectional molds depending on the shape of a molding to be formed. If the preforming of the decorative sheet is necessary, the foil-decorating injection molding machine is provided with a hot plate for heating and softening the decorative sheet in combination with the injection mold, and small holes for vacuum suction and compressed air supply are formed in the male and the female mold. The female mold may be a sectional mold consisting of a plurality of segments which form suction passages when assembled. When the molding has a relatively flat shape, preforming process may be omitted.

The decorative sheet may be a unit pattern section cut out for each injection molding cycle from a rolled web having a plurality of unit pattern sections or may be a sheet-fed decorative sheet of a predetermined size. Unit decorating pattern sections of a web may be fed successively to a molding position between the male mold and the female mold by a roll-to-roll system which feeds the web having the unit decorating pattern sections to the molding position for successive injection molding cycles by a web feed mechanism and takes up the web by a web take-up mechanism or decorative sheets may successively be fed one at a time to the molding position by an industrial robot (manipulator) provided with suction cups capable of holding the decorative sheet. However, the roll-to-roll system is recommendable in view of productivity.

The foil-decorating injection molding machine may be provided with a clamping means for fixedly holding the decorative sheet on the parting surface of the female mold. The clamping means may comprise a holding frame, and the clamping means may be driven by a driving means for driving a mold clamping mechanism, a driving means for driving an ejector pin mechanism, or a driving means, such as a hydraulic actuator, specially for driving the clamping means.

The decorative sheet may be a laminated coating decorative sheet having a substrate to be attached to a molding to coat the surface of the molding, and a decorative layer formed on the substrate, or a transfer decorative sheet having a decorative layer and a substrate carrying the decorative layer, to be attached to a molding temporarily and to be removed from the molding after the transference of the decorative layer to the molding.

The substrate may be a sheet of a thermoplastic resin, such as a polyvinyl chloride resin, an acrylic resin, a polystyrene resin, an ABS resin, a polycarbonate resin, a polyester resin, a polypropylene resin or a polyethylene resin. The thickness of the substrate may be in the range of about 20 to about 500 μm. The decorative layer may be a layer carrying a printed pattern, a layer of a colored or transparent paint film, a layer of a metal thin film, or a functional layer, such as a layer of a hard paint film, a layer of an antihazing paint film or a layer of a conductive film.

The transfer layer, such as a pattern layer or the like, of the transfer decorative sheet is transferred to a molding. If necessary, a releasing layer may be formed on the substrate. The transfer layer may consist of a releasing layer, a decorative layer or an adhesive layer as occasion demands. The decorative layer may be a pattern layer, a layer of a metal thin film for partially or entirely coating the surface of the molding, or a functional layer, such as a layer of a hard paint film, a layer of an antihazing film or a layer of a conductive film.

The substrate may be a flexible thermoplastic resin film of a polyamide resin, such as nylon 6 or nylon 66, a polyolefine resin, such as a polyethylene resin or a polypropylene resin, or a polyvinyl chloride resin, or a laminate of layers of some of those materials.

A resin for injection molding is selected taking into consideration the required physical properties and the cost of a molding to be produced from generally known thermoplastic resins including ABS resins (acrylonitrile-butadiene-styrene resin), polystyrene resins, vinyl chloride resins, acrylic resins and polycarbonate resins.

The above and other objects, features and advantages of the present invention will become more apparent from the following description taken in connection with the accompanying drawings.

DETAILED DESCRIPTION OF THE PREFERRED EMBODIMENTS

A foil-decorating injection molding machine in a preferred embodiment according to the present invention will be described below with reference to FIGS. 1 to 4, in which parts like or corresponding to those of the prior art foil-decorating injection molding machines respectively provided with the injection molds 40 and 50 described previously with reference to FIGS. 5 to 8 are designated by the same reference characters and the description thereof will be omitted to avoid duplication.

Figure 1:
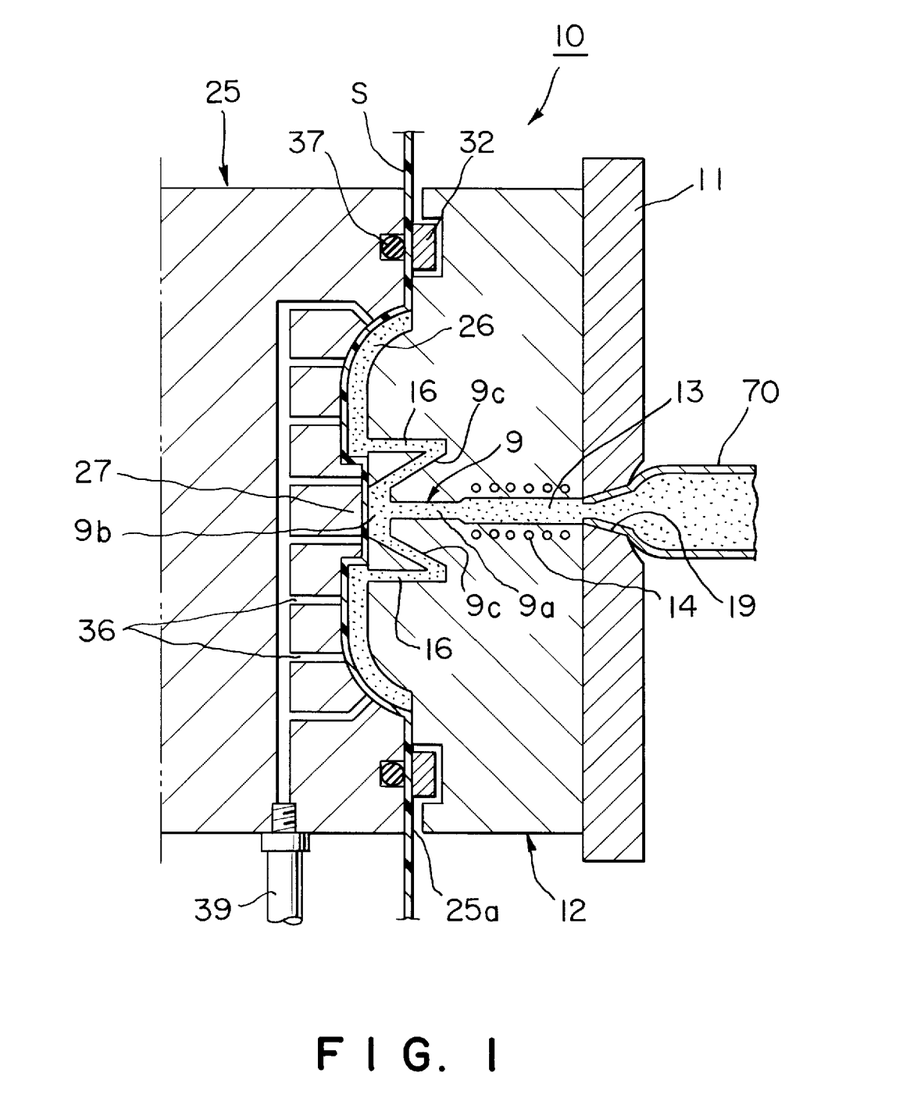
FIG. 1 is a sectional view of an injection mold of assistance in explaining an injection molding process to be carried out by a foil-decorating injection molding machine in a preferred embodiment according to the present invention.
Figure 2:
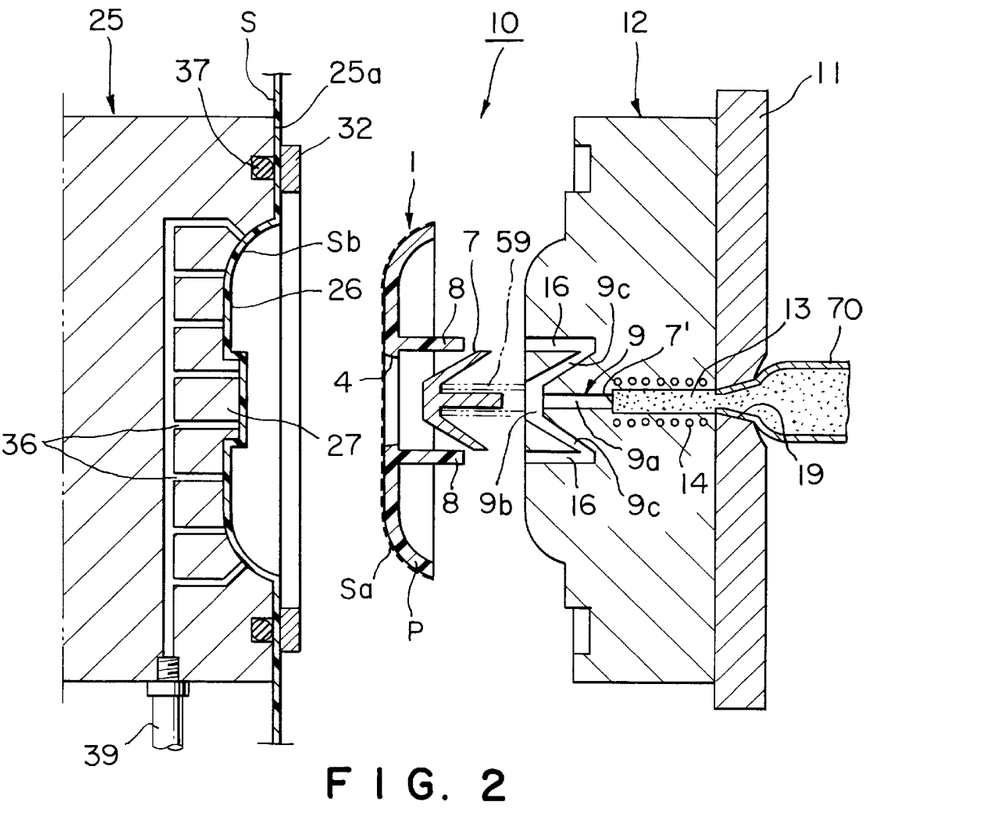
FIG. 2 is a sectional view of the injection mold of FIG. 1 in a molding ejecting process.

Referring to FIGS. 1 and 2, a foil-decorating injection molding machine is provided with an injection mold 10 consisting of a female mold 25, which is the same as those of the injection molds 40 and 50 employed in the prior art foil-decorating injection molding machines, and a male mold 12. The male mold 12 is attached to a stationary platen 11 and is provided with a straight hot runner 13. A nozzle 70 included in an injection unit is pressed closely to a nozzle seat 19 formed in the stationary platen 11, and a molten resin is injected through the nozzle 70 into the hot runner 13. A heating element of a heater 14 is wound around the hot runner 13. A reversing passage 9 is connected to the downstream end of the hot runner 13. The reversing passage 9 has a straight forward feed section 9a, a distributing section 9b at the downstream end of the forward feed section 9a, and two reverse feed sections 9c obliquely extending in the reverse direction from the distributing section 9b. Two straight gates 16 are connected to the downstream ends of the reverse feed sections 9c, respectively. A molten resin injected into the hot runner 13 flows through the forward feed section 9a to the distributing section 9b corresponding to the top surface of a land 27 (see also FIG. 4) formed on the cavity surface of the female mold 25 so as to protrude into a cavity 26 formed between the male mold 12 and the female mold 25 to form an opening 4 in a molding 1. The molten resin then flows in the reverse direction through the reverse feed sections 9c, and then flows through the gates 16 into the cavity 26.

The foil-decorating injection molding machine provided with the injection mold 10 having the male mold 12 carries out the same foil-decorating injection molding cycle as that described above. After the male mold 12 and the female mold 25 have been separated from each other to open the injection mold, the decorated molding 1 with the opening 4 and having a surface decorated by the decorative layer Sa, which is the same in shape as the decorated moldings 2 and 3 shown in FIGS. 5 and 7, is ejected from the foil-decorating injection molding machine by an automatic ejecting mechanism (servomotor-driven air check system). Pin-shaped resin moldings 8 formed in the gates 16 are extracted from the gates 16 and removed together with the molding 1 from the male mold 12. The pin-shaped resin moldings 8 formed in the gates 16 are torn off from a resin molding 7 formed in the forward feed section 9a, the distributing section 9b and the reverse feed sections 9c of the reversing passage 9, and the resin molding 7 is ejected from the male mold 12 with ejector pins 59.

Even if a resin chip 7' remains in the lower end of the hot runner 13 after the completion of the injection molding cycle, the resin chip 7' is carried through the forward feed section 9a to the distributing section 9b corresponding to the land 27 by the molten resin injected into the hot runner 13 in the next injection molding cycle, stays in the distributing section 9b and is not carried further into the reverse feed section 9c. Accordingly, the resin chip 7' does not flow into the cavity 26.

Since the male mold 12 is provided with a hot runner 13 and any residual molding is not formed in the hot runner 13, the male mold 12 need not be moved unlike the prior art male mold 55 shown in FIGS. 5 and 6, which is moved to remove the resin molding 5 formed in the cold runner 62 after the injection mold has been opened. Consequently, the injection mold can be opened by moving the female mold 25 by a short mold opening stroke, and the foil-decorating injection molding machine takes a small space for installation, operates at an improved productivity and needs a simple mechanism associated with the injection mold. Since faulty molding and faulty decoration due to the unsatisfactory adhesion of the transfer decorative layer Sa of the decorative sheet S to the molding 1, and the omission of portions of the decorative pattern rarely occur even if the residual set resin chip 7' exists in the downstream end of the hot runner 13 at the start of an injection molding cycle, the foil-decorating injection molding machine operates at an improved yield with improved reliability.

Figure 3:
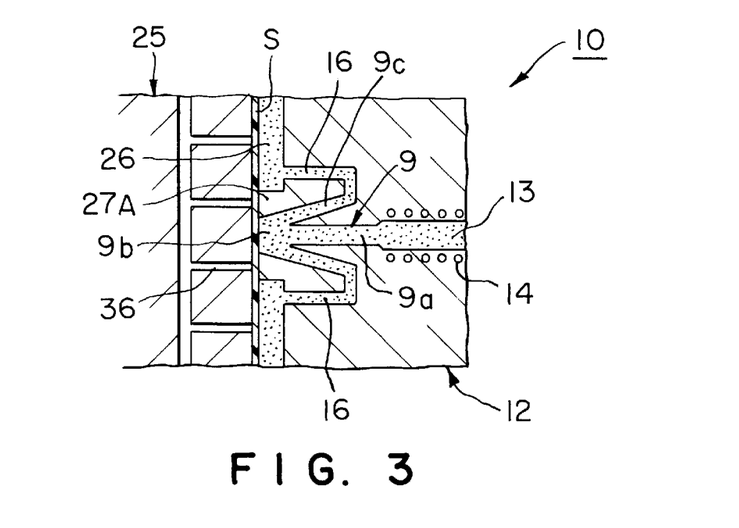
FIG. 3 is a sectional view, similar to FIG. 1, of a modification of the injection mold of FIG. 1.

FIG. 3 shows an injection mold 10 employed in a modification of the foil-decorating injection molding machine in the foregoing embodiment. The foil-decorating injection molding machine in this modification provided with the injection mold 10 shown in FIG. 3 differs from the foil-decorating injection molding machine shown in FIGS. 1 and 2 only in that the injection mold shown in FIG. 3 has a male mold 12 provided with a land 27A corresponding to the land 27 of the female mold 25 shown in FIG. 1, and a female mold 25 is not provided with any land corresponding to the land 27 of the female mold 25 shown in FIG. 1. Since this modification is similar in other respects to the foil-decorating injection molding machine shown in FIGS. 1 and 2, further description thereof will be omitted.

Test foil-decorating injection molding operations were conducted by using the foil-decorating injection molding machine provided with the injection mold 10 shown in FIGS. 1 and 2 as Example 1, the foil-decorating injection molding machine provided with the injection mold 50 shown in FIGS. 5 and 6 as Comparative example 1, and the foil-decorating injection molding machine provided with the injection mold 40 shown in FIG. 7 and 8 as Comparative example 2.

(1) Transfer Decorative Sheet

A transfer decorative sheet S used for the test foil-decorating injection molding operations comprises a substrate, a releasing layer of an acrylic resin, a decorative layer of BC-72 (Showa Ink K.K., Japan), i.e., a mixture of an acrylic resin and a copolymer of vinyl chloride and vinyl acetate, and an adhesive layer of a copolymer of vinyl chloride and vinyl acetate. The releasing layer was formed in a basis weight of 1 g/m$^2$ by using a plate of B60L. A three-color pattern of a grain of wood was printed on the decorative layer by using pattern plates. The adhesive layer was formed in a weight of 2 g/m$^2$ by using a plate having a screen ruling of 40 lines/cm. These transfer layers were formed by a gravure printing method.

(2) Foil-Decorating Injection Molding Method

The transfer decorative sheet S for the next injection molding cycle was located on the parting surface 25a of the female mold 25, and the transfer decorative sheet S was held fixedly in place on the parting surface 25a of the female mold 25 by the sheet holding member 32. Then, a hot plate provided with an infrared radiation heating element was inserted in a space between the male mold 12 (55, 45) and the female mold 25 to heat the transfer decorative sheet S at about 130° C. for softening, the transfer decorative sheet S was stretched and attracted to the cavity surface of the female mold 25 for preforming by sucking air through the suction holes 36, the female mold 25 was advanced toward the male mold 12 (55, 45) to close the injection mold 10 (50, 40), a molten resin was injected through the hot runner 13 (cold runner 62, hot runner 46) into the cavity 26, the female mold 25 was separated from the male mold 12 (55, 45) after the resin injected into the cavity 26 has been cooled and set, and then, a decorated molding decorated by the decorative layer Sa of the decorative sheet S was ejected from the injection mold 10 (50, 40).

(3) Injection Molding Conditions

1) Temperature

Molten resin: 230° C., Hot runner: 240° C., Gates: 235° C., Cold runner: 45° C., Cavity: 35° C., Male mold (core): 45° C.

2) Resin

Heat-resistant ABS resin

3) Shot cycle 5 to 5.5 sec

4) Cooling cycle 20 sec (4) Results

No faulty transfer occurred in moldings molded by the foil-decorating injection molding machine in Example 1 provided with the injection mold 10. Ink omissions of about 1 mm (faulty transfer), were formed in portions corresponding to the gates of 40% of moldings molded by the foil-decorating injection molding machine in Comparative example 2 provided with the injection mold 40. Although no faulty transfer occurred in moldings molded by the foil-decorating injection molding machine in Comparative example 1 provided with the injection mold 50, the automatic ejecting mechanism could not be inserted in the space between the male mold 55 and the female mold 25 and manual work was necessary for removing the moldings from the injection mold 50.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A foil-decorating injection molding machine comprising: an injection unit; and an injection mold including a female mold provided with a recess for forming a cavity, and a male mold provided with a hot runner and a gate through which a molten resin is injected into a cavity formed between the male mold and the female mold, comprising:

a land protruding from said female mold in the cavity to form an opening in a molding molded in the cavity; and means forming a reversing passage in the male mold between the hot runner and the gate so that a molten resin flows first against the land, and then flows in a reverse direction toward an upstream end of the gate said reversing passage having a straight forward feed section connected to a downstream end of the hot runner, a distributing section formed at the downstream end of the forward feed section facing the land, and a reverse feed section extending in an obliquely reverse direction from the distributing section toward the upstream end of the gate, at an acute angle to the forward feed section.

2. The foil-decorating injection molding machine according to claim 1, wherein the land is surrounded by the cavity.

3. A foil-decorating injection molding machine comprising: an injection unit; and an injection mold including a female mold provided with a recess for forming a cavity, and a male mold provided with a hot runner and a gate through which a molten resin is injected into a cavity formed between the male mold and the female mold, comprising:

a land protruding from said male mold in the cavity to form an opening in a molding molded in the cavity, and means forming a reversing passage in the male mold between the hot runner and the gate so that a molten resin flows first through the land, and then flows in a reverse direction toward an upstream end of the gate, said reversing passage having a straight forward feed section connected to a downstream end of the hot runner, a distributing section formed at the downstream end of the forward feed section facing the land, and a reverse feed section extending in an obliquely reverse direction from the distributing section toward the upstream end of the gate, at an acute angle to the forward feed section.

4. The foil-decorating injection molding machine according to claim 3, wherein the land is surrounded by the cavity.

5. A foil-decorating injection molding machine comprising: an injection unit; and an injection mold including a female mold provided with a recess for forming a cavity, and a male mold provided with a hot runner and a gate through which a molten resin is injected into a cavity formed between the male mold and the female mold, comprising:

a land protruding from said female mold in the cavity to form an opening in a molding molded in the cavity, and means forming a reversing passage in the male mold between the hot runner and the gate so that a molten resin flows first against the land, and then flows in a reverse direction toward an upstream end of the gate, said reversing passage extending at an acute angle to a direction in which said hot runner extends.

6. A foil-decorating injection molding machine comprising: an injection unit; and an injection mold including a female mold provided with a recess for forming a cavity, and a male mold provided with a hot runner and a gate through which a molten resin is injected into a cavity formed between the male mold and the female mold, comprising:

a land protruding from said male mold in the cavity to form an opening in a molding molded in the cavity, and means forming a reversing passage in the male mold between the hot runner and the gate so that a molten resin flows first through the land, and then flows in a reverse direction toward an upstream end of the gate, said reversing passage extending at an acute angle to a direction in which said hot runner extends.

* * * * *

UNITED STATES PATENT AND TRADEMARK OFFICE
CERTIFICATE OF CORRECTION

PATENT NO.   : 5,851,558
DATED        : December 22, 1998
INVENTOR(S)  : Hiroyuki Atake It is certified that error appears in the above-identified patent and that said Letters Patent is hereby corrected as shown below:

Title page, item [30], priority, should read –
Foreign Application Priority Data
Nov. 29, 1995    [JP]    Japan    7-310979--.

Signed and Sealed this

Thirteenth Day of April, 1999

Attest:

Q. TODD DICKINSON

*Attesting Officer*   *Acting Commissioner of Patents and Trademarks*